United States Patent [19]
Kitta et al.

[11] Patent Number: 5,329,506
[45] Date of Patent: Jul. 12, 1994

[54] INFORMATION RETRIEVING SYSTEM

[75] Inventors: Kenichi Kitta, Toride; Atsuki Hirose; Yatani Ishikawa, both of Ibaraki, all of Japan

[73] Assignee: Hitachi Maxell, Ltd., Osaka, Japan

[21] Appl. No.: 731,618

[22] Filed: Jul. 17, 1991

[30] Foreign Application Priority Data

Jul. 20, 1990 [JP] Japan ............................ 2-190670

[51] Int. Cl.⁵ .................. H04M 1/00; G11B 17/22
[52] U.S. Cl. ........................... 369/32; 369/47; 379/354; 379/356
[58] Field of Search ............... 379/442, 110, 354, 97, 379/355, 356; 369/32, 47, 48, 54, 58

[56] References Cited

U.S. PATENT DOCUMENTS

| | | | |
|---|---|---|---|
| 4,511,764 | 4/1985 | Nakayama et al. | 379/354 |
| 4,774,596 | 9/1988 | Hashimoto | 369/32 X |
| 5,099,512 | 3/1992 | Shigami et al. | 379/356 X |
| 5,119,417 | 6/1992 | Suzuki et al. | 379/354 |

*Primary Examiner*—James L. Dwyer
*Assistant Examiner*—Paul A. Fournier

[57] ABSTRACT

An information retrieving system in which information arranged by a series of more than one character is inputted and data corresponding to said input information is read out from a disk-shaped recording medium, such that every time the characters of the input information are successively inputted, a head is seeked for a direction of a recording position of the data on the disk-shaped recording medium, corresponding to the input information, and also the head is located at the recording position of the data upon completion of the entry operation of the input information.

18 Claims, 8 Drawing Sheets

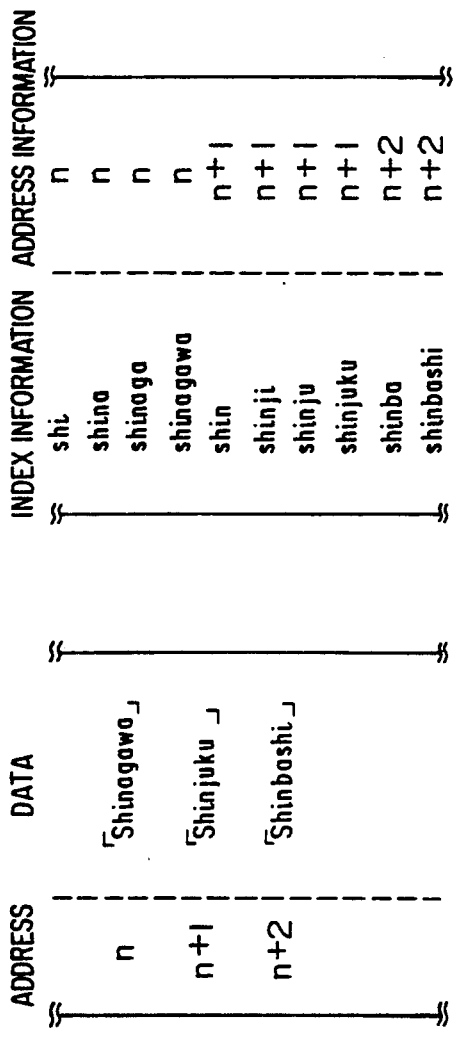

FIG. 8

| Field | Size |
|---|---|
| NAME (KATAKANA) | (16 KATAKANA CHARACTERS) |
| NAME (SURNAME) | (5 KANJI CHARACTERS) |
| NAME (FIRST NAME) | (5 KANJI CHARACTERS) |
| ABBREVIATED OFFICE NAME | (8 KANJI CHARACTERS) |
| ABBREVIATED DEPARTMENT | (8 KANJI CHARACTERS) |
| ABBREVIATED DIVISION | (8 KANJI CHARACTERS) |
| ABBREVIATED SECTION | (8 KANJI CHARACTERS) |
| DIRECT TELEPHONE NUMBER | (12 NUMERALS) |
| MAIN TELEPHONE NUMBER | (12 NUMERALS) |
| SPECIAL NUMBER | (7 NUMERALS) |
| EXTENSION NUMBER 1 | (5 NUMERALS) |

FIG. IOA
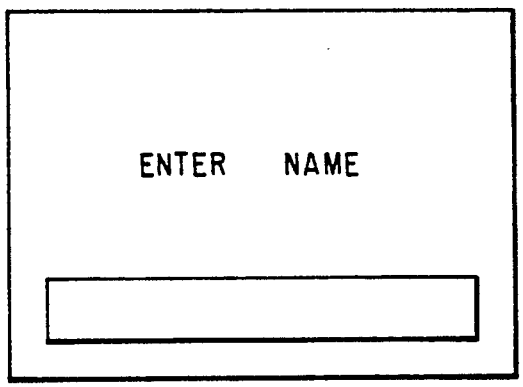
FIG. IOD
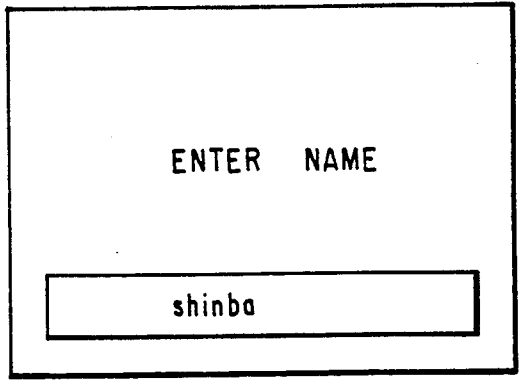
FIG. IOB
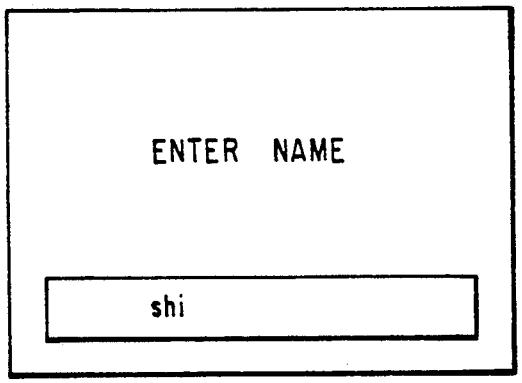
FIG. IOE
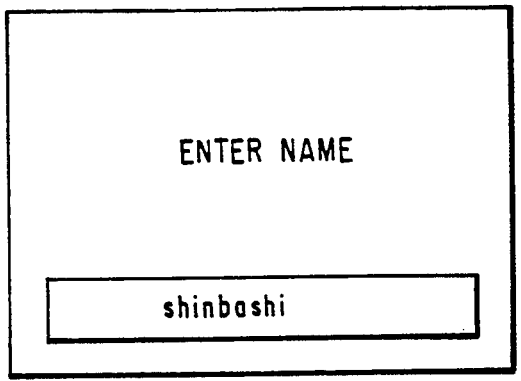
FIG. IOC
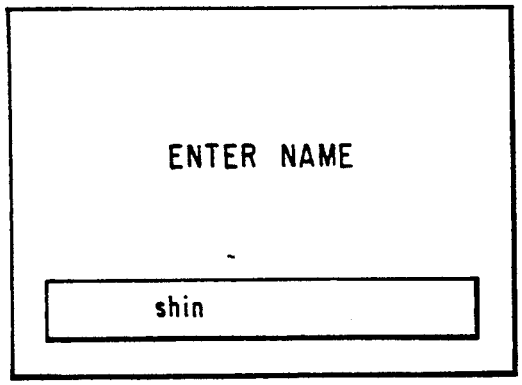
FIG. IOF
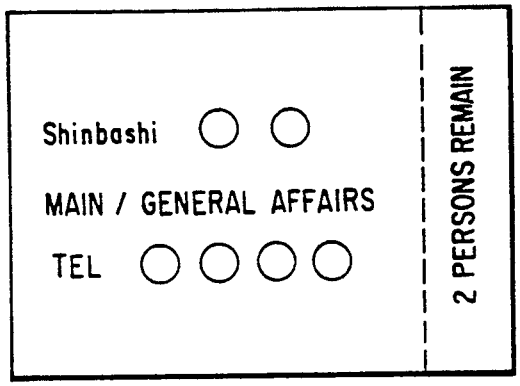

FIG. 11A

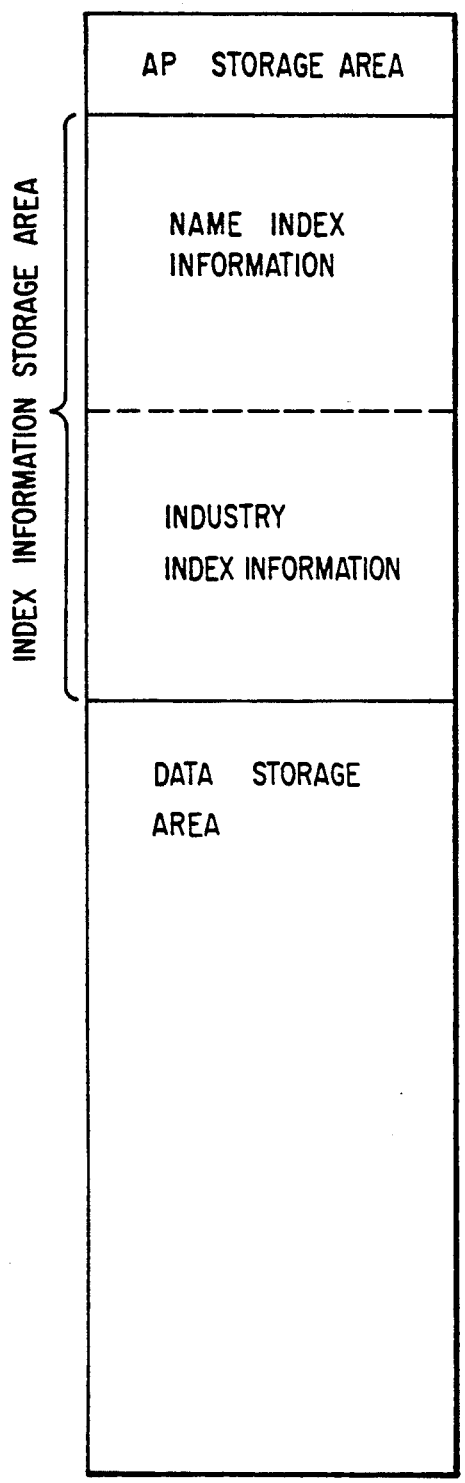

FIG. 11B

| | | |
|---|---|---|
| HEAD OFFICE | INDEX DEPENDING ON JAPANESE SYLLABARY | ADDRESS INFORMATION ATTACHED TO EACH INDEX |
| LABORATORY | INDEX DEPENDING ON JAPANESE SYLLABARY | ADDRESS INFORMATION ATTACHED TO EACH INDEX |
| FACTORY | INDEX DEPENDING ON JAPANESE SYLLABARY | ADDRESS INFORMATION ATTACHED TO EACH INDEX |
| ≈ | | ≈ |
| FACTORY B | INDEX DEPENDING ON JAPANESE SYLLABARY | ADDRESS INFORMATION ATTACHED TO EACH INDEX |
| FACTORY C | INDEX DEPENDING ON JAPANESE SYLLABARY | ADDRESS INFORMATION ATTACHED TO EACH INDEX |

# INFORMATION RETRIEVING SYSTEM

BACKGROUND OF THE INVENTION

1. Field of the Invention

The present invention relates to a retrieving system for information filed in a disk-shaped recording medium.

2. Discussion of Related Art

Recently, attention has been given to disk-shaped mediums such as a floppy disk and a hard disk functioning as a magnetic disk and an optical disk. These disk-shaped mediums have such advantages that access time of desirable data to recording positions during the data retrieving operation can be considerably shortened, as compared with that of a tape-shaped recording medium. More specifically, as to the optical disks, since memory capacities thereof are rather great, such optical disks are the best data recording medium in the file systems. For instance, as to a CD (compact disk) employed as the recording medium of music information, the storage capacity of one side thereof amounts to 500 megabytes. When this CD is employed as a recording medium of a file system (will be referred to as a "CD-ROM"), it is possible to file a huge amount of data in a single CD-ROM.

In the file system with employment of this disk-shaped medium, the index information has been provided with each of the data recorded on the disk-shaped medium, and the tables have been set by which the index information corresponds to address information indicative of the recording position for the data corresponding to this index information on the disk-shaped recording medium. For instance, assuming that data recorded on a disk-shaped recording medium is related to personal histories, the index information will correspond to each of individual means.

When desirable data is read out from the disk-shaped recording medium, information (guidance information) for instructing index information corresponding to this data is externally inputted. In the file system, a search is made of the address information corresponding to the inputted guidance information from the above-described tables, and the disk drive apparatus is driven so as to read out the data recorded on the position of this disk-shaped recording medium which is defined by this address information.

In the disk drive apparatus, upon receipt of the address information, such a seeking or search operation is performed whereby the head is transported in a radial direction of the disk-shaped recording medium until it reaches the track containing the recording region on the disk-shaped recording medium designated by this address information, and the desirable data is reproduced from this recording region.

On the other hand, in the conventional file system, since the index information has a relationship with the disk-shaped recording medium with one to one correspondence, after the guidance information corresponding to this data has been inputted, the retrieving operation is commenced. In other words, after the input operation of the guidance information has been accomplished, the verification between this guidance information and the index information at the above-described tables is carried out to determine the address information, and then the disk drive apparatus starts its seeking or searching operation in response to this address information.

As a consequence, even when the input operation of the guidance information has been accomplished, the desirable data cannot be instantaneously obtained, but may be obtained after a predetermined time period has passed. If consideration is made, for instance, of a CD-ROM, the seeking time required from an innermost part thereof to an outermost part thereof becomes 0.6 to 1 second. Accordingly, the seeking or searching time for data which has been recorded on the recording position close to the innermost part of CD-ROM becomes short. However, even if the time required for verifying the guidance information with the index information on the above-described tables may be neglected or disregarded (for instance, 7 to 8 microseconds required for one verification), the desirable data cannot be simultaneously obtained when the input operation of the guidance information is completed. Moreover, the time periods required after the input operation of the guidance information has been completed until the desired data is available, are different from each other, depending upon the data recording positions on the disk-shaped recording medium. As a result, in the case that the retrieving operation for the data positioned at the outermost side of the disk-shaped recording medium is carried out subsequent to the retrieving operation for the data positioned at the innermost side thereof, a user probably feels that such a data retrieving operation for the outermost side takes a longer time period.

SUMMARY OF THE INVENTION

An object of the present invention is to solve the above-described problems and, therefore, to provide an information retrieving system in which desirable data can be continuously obtained at the same time as when the input operation or inputting of index information is completed, and thus a highspeed retrieving operation is realized.

To achieve the above-described object, according to the present invention, every time each character of input information is entered, a head is moved to seek or search for a direction of a recording position of data corresponding to the input information of a disk shaped recording medium.

The time required for inputting the characters by the keyboard, namely time required for depressing the keys on the keyboard, will become longer than the seeking or searching time of the head for the disk drive apparatus. Since the head is moved to seek the data recording positions every time one character is entered, this head is stopped at the recording position of this data when the inputting operation of the input information is completed, whereby this data can be immediately reproduced.

BRIEF DESCRIPTION OF THE DRAWINGS

FIGS. 6A and 6B are explanatory diagrams of address information related to the index information;

FIG. 7 represents a concrete example of key arrangements of the keyboard shown in FIG. 1;

FIG. 8 illustrates an arrangement example of data stored in the data storage area shown in FIG. 3;

FIGS. 10A to 10F illustrate an example of display screens in the display apparatus shown in FIG. 1 in connection with the above retrieving operation; and, FIGS. 11A and 11B represent another concrete example of a recording area in CD-ROM shown in FIG. 1.

DETAILED DISCUSSION

An information retrieving system according to the present invention, which has been applied to a telephone number filing system, will now be described with reference to the drawings.

First, a perspective view of a telephone number filing system will be explained with reference to FIG. 2.

Figure 2:
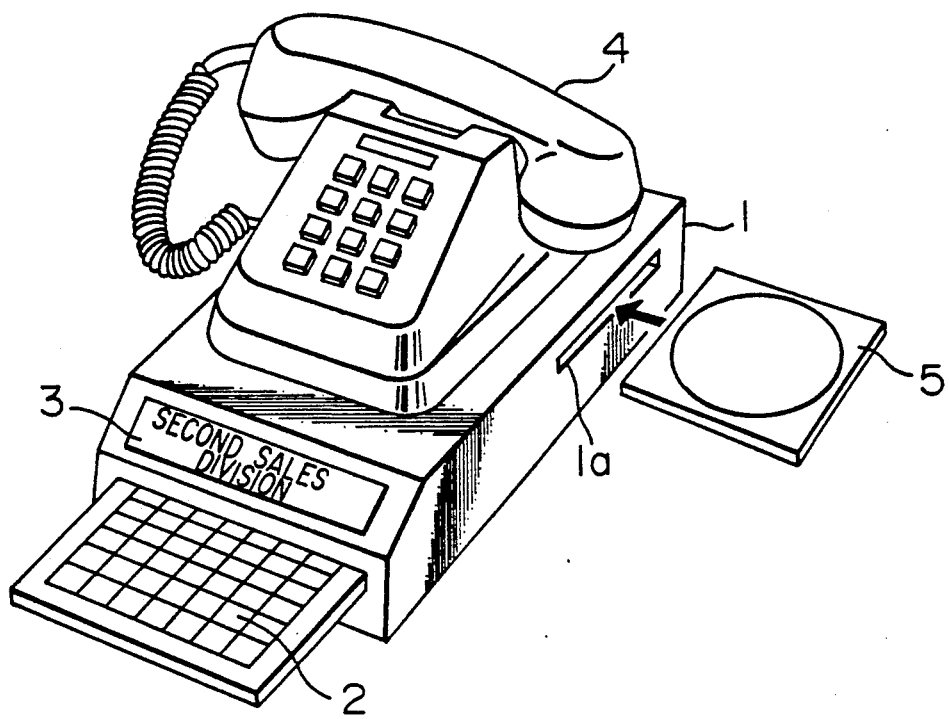
FIG. 2 is a perspective view of the information retrieving system.

In FIG. 2, a drive apparatus and the like for driving a retrieving apparatus and a CD-ROM (Compact Disk-Read-Only Memory) 5 (will be described later) are built in a housing 1. Also, a keyboard 2 and a display apparatus 3, such as a liquid display device, are provided in the housing 1. Since the keyboard 2 is made of a draw out type, this keyboard 2 may be pushed into the housing 1. Although not shown in FIG. 2, there are two jacks on a rear side of the housing 1, by which both a telephone set 4 and a public telephone line (otherwise an extension) are connected to circuitry of the housing 1.

Operation of this telephone number filing system will now be briefly explained. That is, telephone numbers have been recorded, or stored in the CD-ROM 5 as data. When this CD-ROM 5 is inserted through an insertion hole 1a formed on the housing 1 so as to be mounted on the disk drive apparatus, the telephone number retrieval may be performed. Then, when a user manipulates the keyboard 2 to enter guidance such as a name, the data retrieving operation at the CD-ROM 5 is performed. The retrieved data (telephone number and the like) is displayed on the display apparatus 3. When the keyboard operation by the user is carried out so as to communicate with this displayed data, a person who is to be communicated to is automatically called. When the called person picks up a receiver, a telephone communication is initiated.

Figure 1:
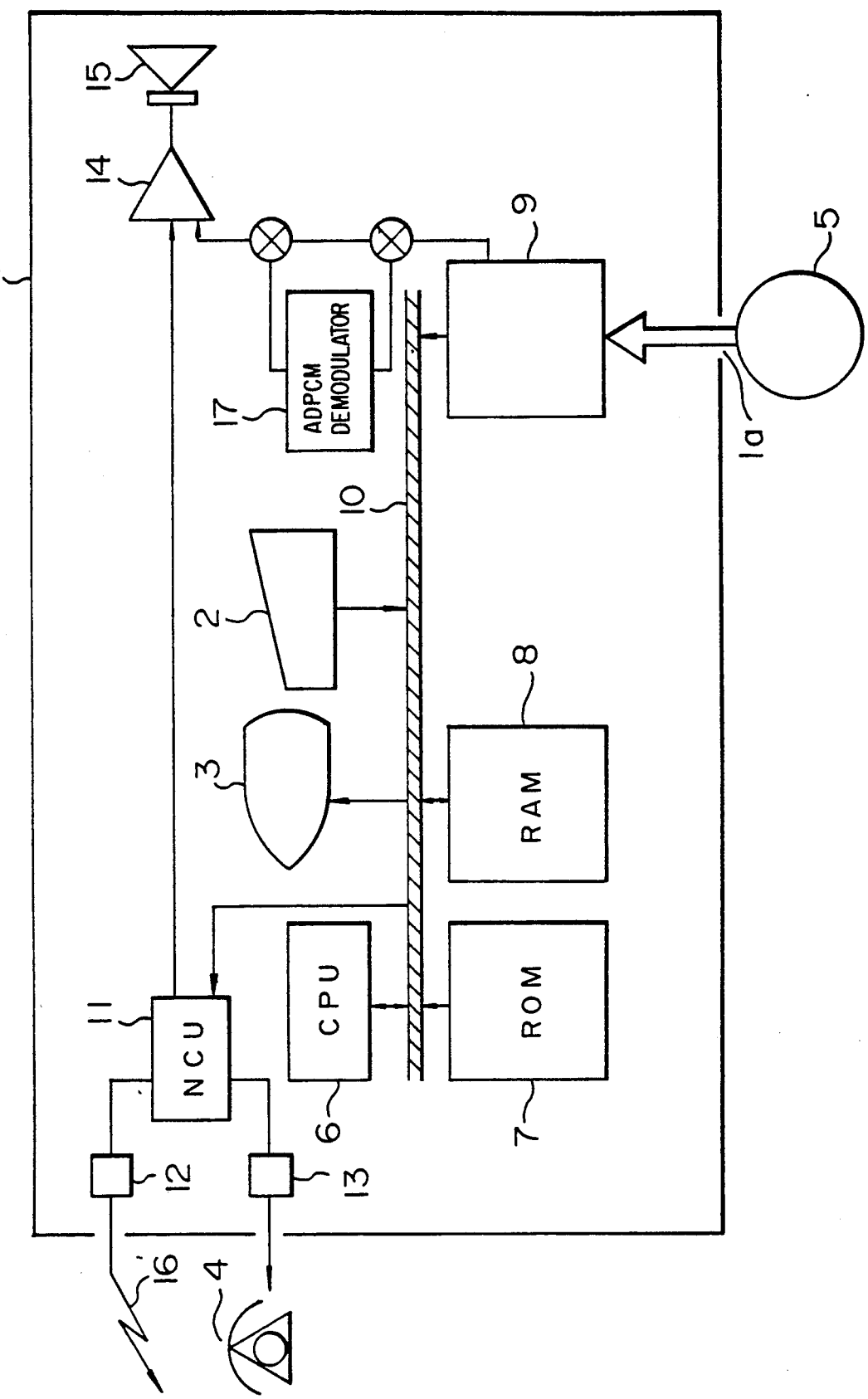
FIG. 1 is a schematic block diagram for representing an information retrieving system according to a preferred embodiment of the present invention.

FIG. 1 is a schematic block diagram of an information retrieving system according to a preferred embodiment of the present invention. In FIG. 1, reference numeral 6 indicates CPU (central processing unit); reference numeral 7 denotes a ROM (read-only memory); reference numeral 8 represents a RAM (random access memory); reference numeral 9 is a disk drive apparatus; reference numeral 10 indicates a bus; reference numeral 11 denotes an NCU (network control unit); reference numerals 12 and 13 represent jacks; reference numeral 14 is an amplifier; reference numeral 15 indicates a speaker; and also reference numeral 16 denotes either a public telephone line, or an extension line. It should be noted that the same reference numerals are employed to denote the corresponding part shown in FIG. 2.

In FIG. 1, either the public telephone line or extension line 16 is connected via the jack 12 to NCU 11, or the telephone set 4 is connected via the jack 13 to NCU 11.

On the other hand, index information, data on telephone numbers and the like, and also a telephone book retrieving program, as an application program (AP), for retrieving the data, such as the telephone numbers, have been recorded on CD-ROM 5 (will be discussed later). Address information representative of recording positions at CD-ROM 5 is attached to the respective index information. A system program for performing an initiation operation of CPU 6 has been stored into ROM 7.

When this CD-ROM 5 is inserted via the insertion hole 1a of the housing 1 into the housing 1, so as to be mounted on the disk drive apparatus 9, CPU 6 commences its operation in accordance with the system program stored in ROM 7; initiates each of the units; energizes the disk drive apparatus 9 so as to read both all of the index information attached to the address information, and also the telephone book retrieving program from CD-ROM 5; and also writes the information and telephone book retrieving program into RAM 8. When this data writing operation to RAM 8 has been completed, CPU 6 displays a request for entering the guidance information on the display apparatus 3.

When the user manipulates the keyboard 2 to enter the guidance information, the CPU 6 is operated in response to the telephone book retrieving program stored in RAM 8 in order to verify the entered guidance information with the index information stored in RAM 8.

Data has been recorded on CD-ROM 5 in a specific recording sequence (will be described later). Also the index information has been set in a similar manner, so that every time one character of the guidance information consisting of a plurality of characters is entered, verification is carried out between the entered character and the index information stored into RAM 8, whereby the address information is determined. Thus, every time the address information is determined, the CPU 6 causes the disk drive apparatus 9 to be operated so as to move the head to seek a position of CD-ROM 5 designated by this address information. As described above, every time the characters are inputted by manipulating the keyboard 2 (namely every time the keys of the keyboard 2 are depressed), the seeking operations are performed in the disk drive apparatus 9 and thus the head successively approaches the recording position of desirable data corresponding to the entered guidance information.

As previously described, the seeking operation for the desired data on the CD-ROM 5 is carried out in the disk drive apparatus 9 in combination with entries of the guidance information by the keyboard 2 (in other words, without waiting for completion of inputting the guidance information). Once the guidance information has been completely entered, the desired information may be immediately read out from CD-ROM 5.

The desired data which has been read out from CD-ROM 5 are written into RAM 8 and also displayed on the display apparatus 3. After the user has confirmed the display information on this display apparatus 3, he manipulates the keyboard 2 for the line connection purpose, the telephone number data among the desired data which has been written into RAM 8 is read out and then supplied to NCU 11. NCU 11 converts this telephone number data into a corresponding dial signal and thereafter sends this dial signal via the jack 12 to either the public telephone line or extension line 16. As a result, the calling operation for a person who is called is commenced and, in connection thereto, the calling signal which has been sent via the public telephone line or extension line 16 is transferred via the jack 12, NCU 11, and amplifier 14 to the speaker 15, and also, a sound indicating that the person who is called is under calling operation is produced. When the person who is called hooks off the telephone receiver, the calling signal is interrupted. The CPU 6 senses this fact and controls the NCU 11, whereby the telephone set 4 is connected to either the public telephone line or the extension line 16 so as to be brought into the telephone conversation state. When the telephone conversation is completed, the CPU 6 senses this fact and causes the NCU 11 to be set to the original state.

A description will now be made of CD-ROM 5 shown in FIG. 1.

Figure 3:
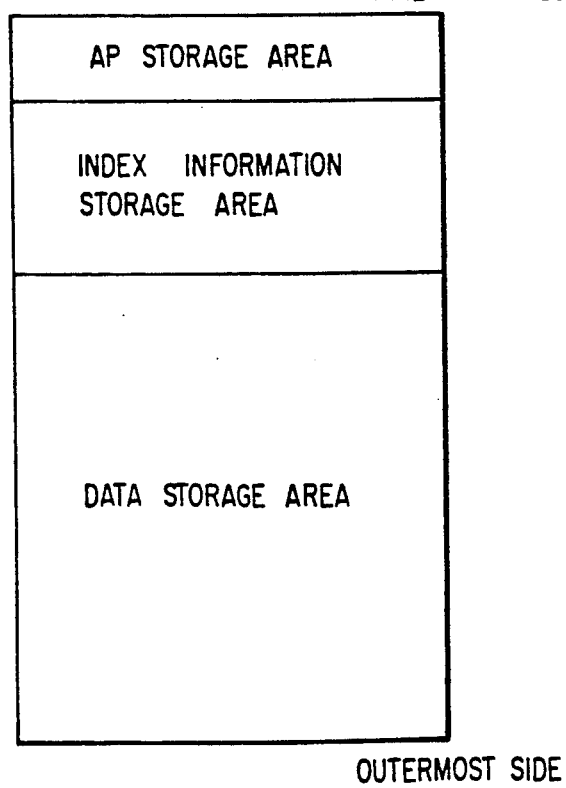
FIG. 3 is an illustration of a concrete example of a recording area of CD-ROM shown in FIG. 1.

As shown in FIG. 3, in CD-ROM 5, there are provided in an order from an innermost side thereof to an outermost side, an AP storage area for storing therein the telephone number book program; an index information storage area for storing therein index information to which the address information has been attached; and a data storage area for storing therein data such as the telephone numbers. When the CD-ROM 5 is mounted on the disk drive apparatus 9, the data operations are performed from the AP storage area and index information area, and then the read information is written into RAM 8.

Figure 4:
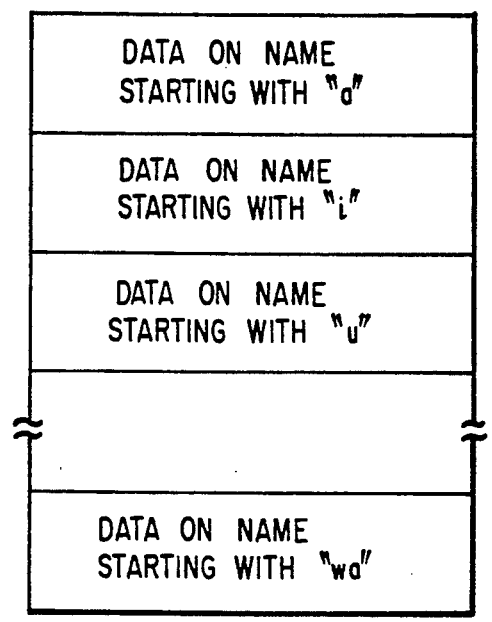
FIG. 4 is an illustration for explaining a rule to determine a storage sequence of data at a data storage area shown in FIG. 3.

It should be noted that the data has been filed in the data storage area in accordance with a predetermined rule, this rule is determined in the order of the Japanese syllabary such as a, i, u, e, o, . . . , and also names contained in the data are treated based on this rule. In FIG. 4, there is shown a data arrangement in the order of the Japanese syllabary with respect to first characters of the respective names. This arrangement rule is similar to, for instance, a Japanese-language dictionary. For example, in case that data on persons whose surnames or family names are Ueno, Shinjuku, Shinbashi and Shinagawa are filed, Ueno starts with "u" and the remaining three person's names start with "shi". When three persons are arranged based on the above-described rule, Ueno, Shinagawa, Shinjuku and Shinbashi are filed in this order.

With the above-described rule, if the character arrangements of the names have close relationships with each other, these names are recorded on the close recording positions (alphabetic names of English and American people may be handled in a similar way).

The index information has been also set in correspondence with the relevant data. Furthermore, such index information as a first character of a name, a combination between the first character and a second character, a combination between the first character and a third character is formed, and then plural pieces of the index information are connected with each other in a tree-shaped relationship where the first character is positioned at a summit. For instance, as to the names of Shinagawa, Shinjuku and Shinbashi, the index information set thereto is represented in FIG. 5.

That is to say, the index information "shinagawa" of the data on "Shinagawa(Kanji)" is subdivided from index information "shi(Katakana Character)" into index information "shina" and "shinaga", and is categorized under index information "shinaga". Also, the index information "shinjuku" of the data on "Shinjuku" is subdivided from index information "shi" into index information "shin", "shinji" and "shinju", and also is categorized under the index information "shinjuku". The index information "shinbashi" of the data on "shinbashi" is categorized under index information "shinba" similarly subdivided from the index information "shi".

Figure 5:
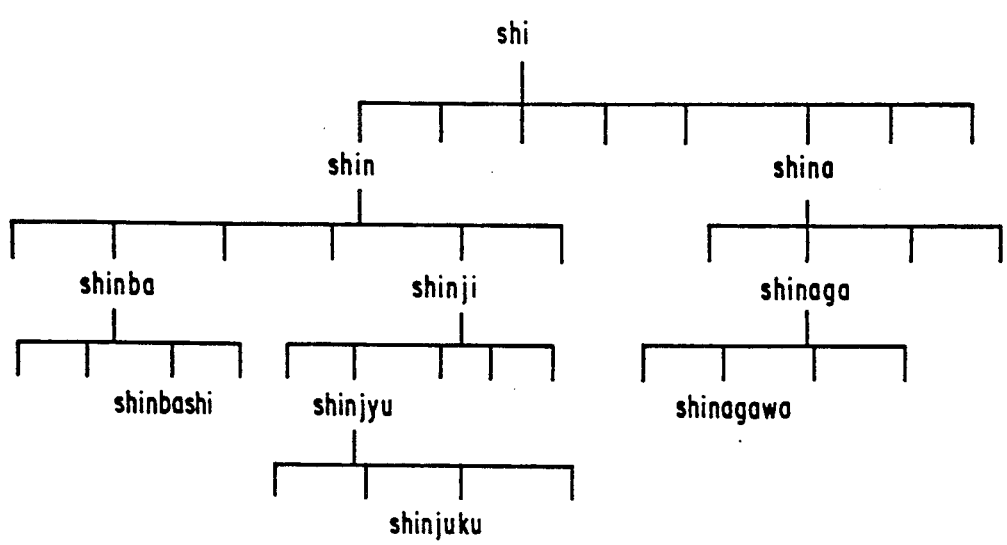
FIG. 5 is an explanatory diagram of index information at the index information storage area shown in FIG. 3.

For the sake of easy explanation, assuming now that there are only three names starting with the character "shi", namely "Shinagawa" "Shinjuku" and "Shinbashi", and as shown in FIG. 6A, the data on "Shinagawa" has been stored at the address "n" of the data storage area indicated in FIG. 3; the data on "Shinjuku" has been stored at the address "n+1"; and the data on "Shinbashi" has been stored at the address "n+2", all of the index information corresponding to these name data are shown in FIG. 5, as represented in FIG. 6B. Then, it is assumed that the address information attached to the index information is selected to be an address at which the topmost data of the name data containing the characters to constitute the index information has been stored.

For instance, since the character "shi" is contained in the name of the first data on "Shinagawa", the address information attached to the index information "shi" becomes an address "n" at which the data "Shinagawa" has been stored. Subsequently, the address information attached to the index information "shina", "shinaga" and "shinagawa" corresponds to "n"; the address information attached to the index information "shin", "shinji" "shinju" and "shinjuku" corresponds to "n+1"; and also the address information attached to the index information "shinba" "shinbashi" corresponds to "n+2", which is similarly determined.

As previously stated, the data are stored and the index information attached to the address information is set. Then, the data retrieving operation will now be explained.

Now, a concrete example of keys of the keyboard 2 will be described with reference to FIG. 7.

In FIG. 7, symbols "F1" to "F8" correspond to a function key and the remaining keys are an entry key for entering the guidance information. The functions of these function keys are defined as follows:

F.1: line connecting key,
F.3: forward scroll key,
F.4: backward scroll key,
F.5: retrieval execution key,
F.7: clear key for inputted guidance information,
F.8 correction key for inputted guidance information.

The function keys F.2 key and F.6 key are not used.

FIG. 8 represents one example of data arrangements stored in the data storage area (shown in FIG. 3) of CD-ROM 5.

As apparent from this figure, the data are constructed of name data represented by 6 KATAKANA characters at maximum; data on surname and first name which are indicated by 5 KANJI characters at maximum, respectively; data on abbreviated industry, department, division and section which are represented by 8 KANJI characters at maximum, respectively; data on a direct telephone number and a main telephone number which are indicated by 12 numerals at maximum, respectively; data on a special number represented by 7 numerals at maximum; and also data on an extension number indicated by 5 numerals at maximum. It should be noted that the data arrangement previously explained in FIGS. 4 and 6A, setting the index information previously described in FIG. 5 and 6B and also a mutual relationship are made on the basis of the name data indicated by KATAKANA characters.

The retrieving operation according to this preferred embodiment, for retrieving a telephone number with respect to the data on "Shinbashi" will now be described with reference to FIG. 9 on the basis of the above-explained fact.

Figure 9:
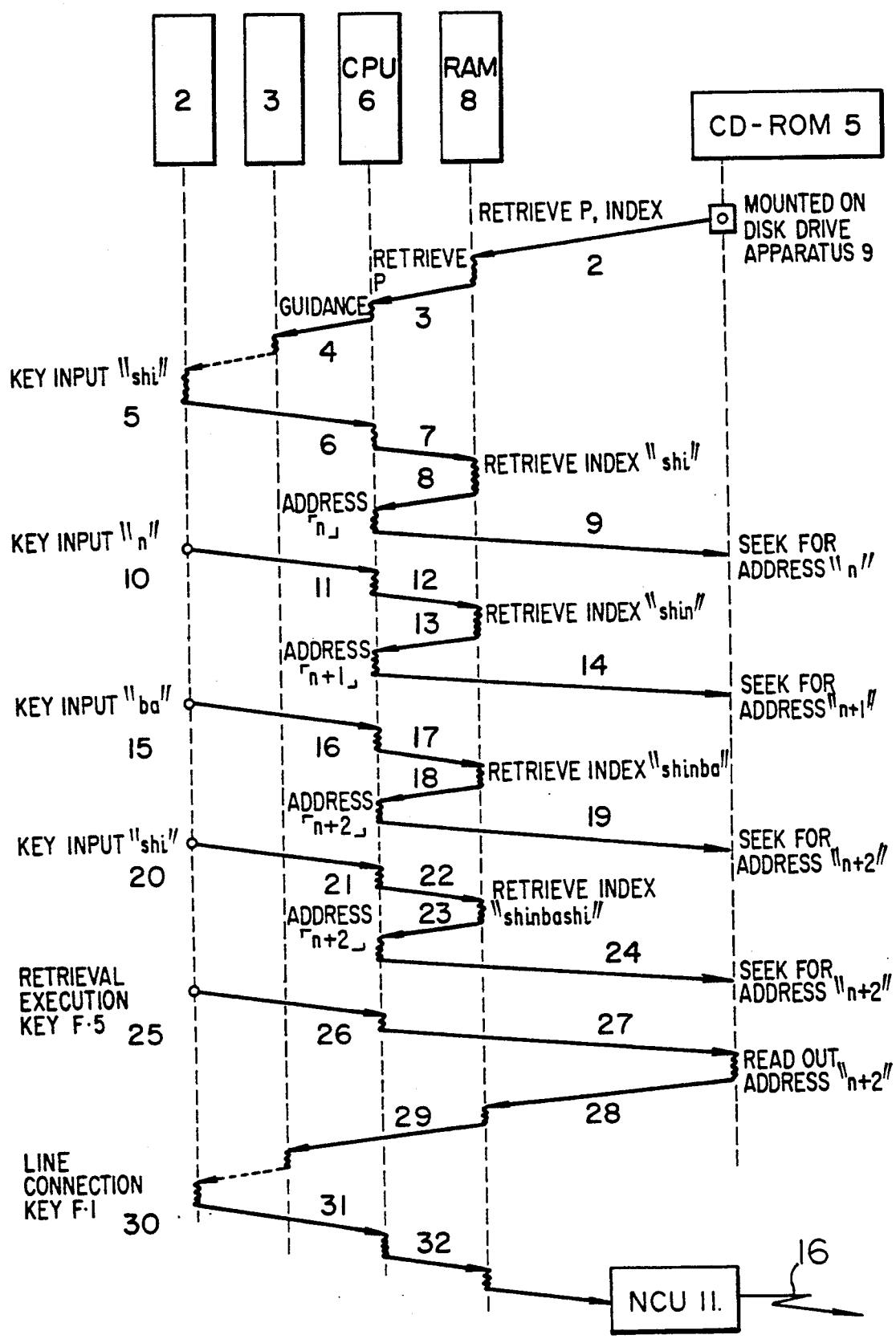
FIG. 9 represents a retrieving operation performed in the preferred embodiment shown in FIG. 1.

First, in FIG. 9, when CD-ROM 5 is mounted on the disk drive apparatus 9 (a step ①), as previously explained, both the telephone book retrieving program which has been stored in the AP storage area (FIG. 3) of this CD-ROM 5 and the index information having the address information which has been stored in the index information storage area (FIG. 3), as shown in FIG. 6B, are read out and then stored into RAM 8 (a step ②). Then, CPU 6 reads out this telephone book retrieving program from RAM 8 (a step ③) and subsequently executes this program.

As shown in FIG. 10A, CPU 6 transmits character information to the display apparatus 3 and displays such a screen "Enter Name" the instruct entry of the guidance information (a step ④).

Thus, a user manipulates the input keys (FIG. 7) of the keyboard 2 in order to entry the characters "shi, n, ba, shi". It should be understood that these characters are not entered at the same time, but the characters "shi", "n", "ba", "shi" are successively inputted in this order.

When the character "shi" is inputted (a step ⑤), CPU 6 fetches this information (a step ⑥) to display this character on the display apparatus 3 (this displayed screen is shown in FIG. 10B); successively reads out the index information from RAM 8 to verify the road index information with the character "shi" and then retrieves the index information "shi" (a step ⑦). Then, when the index information "shi" is retrieved, the address information "n" attached thereto (FIG. 6b) is read out from RAM 8 (a step ⑧), the disk drive apparatus 9 is operated based on this address information thereby to move the head from the home position so as to seek for the address "n" of CD-ROM 5 (a step ⑨). After the character "shi" is inputted by the keyboard 2, the subsequent character "n" is entered during which a lengthy time period (on the order of second at minimum) has passed, depending upon degrees of skilled keyboard operation, and also the operations as defined from the steps ⑥ to ⑨ are performed. As a result, the seeking operation to the address "n" on CD-ROM 5 is completed so that the head is at the position of this address "n".

Thereafter, when the character "n" is inputted by way of the key operation of the keyboard 2 (a step ⑩), CPU 6 fetches this character (a step ⑪), displays a screen shown in FIG. 10C on the display apparatus 3 and also performs the retrieving operation of the index information "shin" from RAM 8 (a step ⑫), and then reads the address information "n+1" (shown in FIG. 6b) attached to this index information (a step ⑬). Then, the disk drive apparatus 9 is operated so as to seek for the address "n+1" of CD-ROM 5 (a step ⑭). As a consequence, when the character "ba" is entered from the keyboard 2 (a step ⑮), the index information "shinba" is retrieved in a similar manner to that of the above-described character "n", so that the seek operation is carried out with regard to the address "n+2" of CD-ROM 5 (steps ⑯ to ⑲). A screen displayed on the display apparatus 3 at this time is represented in FIG. 10D.

Subsequently, when the character "shi" is entered, the index information "shinbashi" is retrieved. As the address information with respect to this inputted character "shi" is the same "n+2" as the above case, no seeking operation is carried out on CD-ROM 5 and therefore the head remains stopped at the position of the address "n+2" (steps ⑳ to ㉔). A screen displayed on the display apparatus 3 at this time is shown in FIG. 10E.

After the character "shinbashi" has been inputted, when the user judges that the correct entry has been completed via the screen shown in FIG. 10E and then manipulates the retrieve execution key F.5 (FIG. 7) (a step ㉕), CPU 6 fetches it (a step ㉖), causes the disk drive apparatus 9 to be operated in order to reproduce the data "Shinbashi" stored at the address n+2 of CD-ROM 5 (a step ㉗), and writes the data into RAM 8 (a step ㉘). At the same time, CPU 6 reads out the data from RAM 8 to the display apparatus 3, whereby as shown in FIG. 10F, the name, industry (firm) and belonging written by KANJI characters together with the telephone number are displayed (a step ㉙).

Then, when the user confirms this screen and operates the line connection key F.1 (FIG. 7) of the keyboard 2 (a step ㉚), CPU 6 reads out the data on the telephone number from RAM 8 in response to this operation (a step ㉛) and then sends it to NCU 11 (a step ㉜). As a result, a telephone conversation is available. When the head reproduces the desirable data, then it returns to a home position.

As previously explained, when the guidance information is entered by operating the keyboard 2, the seeking operation is simultaneously performed on CD-ROM 5, whereas when the guidance information input operation is accomplished, the head is at the storage position of the desirable data. As a consequence, when retrieval execution key F5 is operated, the desirable data is displayed at the same time on the display apparatus 3 and the desirable data can be instantaneously obtained. Furthermore, even when the desirable data are positioned at any storage positions on the CD-ROM 5, the desirable data can be immediately obtained.

To the contrary, in accordance with the conventional data retrieving system, after the input operation of the guidance information has been ended and then the retrieval execution key has been manipulated, the retrieving operation of the index information is performed and thereafter the seeking operation and the data reproduction are performed on the CD-ROM 5. As a consequence, the data retrieving operation according to the above-described preferred embodiment can be executed at very high speed, as compared with the above conventional retrieving operation.

Although it was assumed in the above-described explanation that there was only one name "Shinbashi", there are three persons whose surnames are "Shinbashi" and each of these name data has been stored in CD-ROM 5. When the information on "Shinbashi" is inputted from the keyboard 2, the retrieving operations defined at the steps ㉒ and ㉓ shown in FIG. 9 are performed with respect to all of the index information "shinbashi" and then the address information thereof are read out by CPU 6. However, at the step ㉔, the seeking operation is performed at the head positions of the address information.

Thereafter, the data readout operations with respect to all of the address information obtained at the step ㉓ are performed from CD-ROM 5 and the read data are written in RAM 8 (a step (28)). However, the content of the screen displayed on the display apparatus 3 is the data stored at the head position of CD-ROM 5 among three pieces of data "Shinbashi". To announce that the remaining two data "Shinbashi" is present, as shown in FIG. 10F, for instance, such a character image "two persons are left" is simultaneously displayed on the display apparatus 3.

To display, these two remaining data "Shinbashi", either the forward scroll key F3 or the backward scroll key F4 may be manipulated. It should be noted that when the forward scroll key F3 is operated, data positioned after the present data by one data is displayed, whereas when the backward scroll key F4 is manipulated, data positioned before the present data by one data is displayed.

When the line connection key F1 is operated and the telephone conversation is available, only the data on the telephone number displayed on the display apparatus 3 is effective.

The above operation is similarly applied to such a case where persons have the same surnames and the same first names, respectively.

After the guidance information has been entered from the keyboard 2, when the clear key F7, shown in FIG. 7 is operated, the overall guidance information fetched by CPU 6 is cleared. In connection therewith, in the disk drive apparatus 9, the head is moved to the home position at the inner side of CD-ROM 5.

When the correction key F8 is operated, the characters of the guidance information which have been fetched by CPU 6 are successively cleared one by one in a predetermined order that the latest inputted guidance information is first cleared. However, until all of the guidance information characters are cleared, the head is not moved to any place. The characters which are not corrected are effectively held by the CPU 6 and the retrieving operation of the index information which has been so far performed is in effect.

When, for instance, the guidance information "Shinjuku" is mistakenly inputted, though the guidance information "Shinbashi" is originally entered, the head is positioned at the place of the address "n+1" of CD-ROM 5. Even when the character "juku" is cleared by using the correction key F8, this head never changes its position. It should be noted that the character "juku" is deleted and only the character "shin" is displayed on the display apparatus 3. When the character "ba" is inputted after clearing the character "juku", CPU 6 starts to perform the operation at the step (16) shown in FIG. 9, so that the head is moved to seek from the address n+1 on CD-ROM 5 to the address n+2.

It should be noted that when the overall guidance information which has been entered is cleared by operating the correction key F8, the operation similar to that when the clear key F7 is manipulated, is performed.

In accordance with the above-described preferred embodiment, the telephone numbers can be retrieved from the data on names. Alternatively, the telephone numbers may be retrieved based upon the belonging data on industry (firm), department, division and section and the name data. A description will now be made of index information on CD-ROM 5 in this case with reference to FIGS. 11A and 11B. It should be noted that the index information which is set based on the above-described names will be referred to as name index information, whereas the index information which is set based on belonging will be referred to as belonging index information.

FIG. 11A represents an area of CD-ROM 5 in such a case that the above-described index information has been employed.

In FIG. 11A, the data has been stored in an AP storage area and a data storage area in a similar manner of FIG. 3, and also the data having the arrangements as shown in FIG. 8 has been stored in accordance with the rule as described with reference to FIG. 4, into a data storage area. To the contrary, both the above-described index information and industry index information have been stored in the index information storage area. The name index information is completely identical to the index information which was previously explained in FIGS. 5 and 6, and is employed when the retrieving operation is performed as the name and input information, whereby the retrieving operation as explained in FIG. 9 is performed.

The industry index information is subdivided into each of industries such as, for example, a head office, a laboratory and a factory, as represented in FIG. 11B. The index information is provided with each subdivided industry, which has been explained with reference to FIGS. 5 and 6. The industry index information is employed in case that retrieval is performed with respect to names of the industries and names as input information.

As an input sequence for this input information, a name of an industry is positioned at a top. When a name of an industry is entered, the retrieving operation as shown in FIG. 9 by CPU 6 is performed in such a manner that the index information to be verified is restricted only to the index information designated thereby, and subsequently when a name is inputted, only the index information to be verified is used for the retrieving operation. For example, assuming now that the name of the inputted industry is "a head office", the verification effected at the previous steps (7), (12), (17) and (22) shown in FIG. 9 is carried out only for the index information with regard to "the head office".

Accordingly, assuming now that there are persons whose names are the same "Shinbashi" in the head office and the factory "A", and also these names have been stored at addresses of "m" and "m+1" in the respective data storage areas, although there are such index information as "shi" "shin" "shinba" and "shinbashi", corresponding to the head office and factory "A", respectively, the address information attached thereto is different from each other with respect to the head office and factory "A". Accordingly, the seeking positions of the head according to the steps (9), (14), (19) and (24) shown in FIG. 9 are different from each other in case that a designation is made of the person whose name is "Shinbashi" present at the head office, and also another designation is made of the person whose name is "Shinbashi" present at the factory "A".

Thus, if both the industry and name are used as the input information, when the name is inputted, the head is directly seeked for the data corresponding to this input information.

As previously described, the preferred embodiments according to the present invention have been explained as the retrieving systems for the telephone numbers. However, the present invention is not limited only to these preferred embodiments.

That is to say, since an application program is stored at the AP storage area of CD-ROM 5, and the CPU 6 reads out this application program therefrom so as to perform the retrieving process in accordance with the read application program, even when any sorts of data have been stored in the CD-ROM 5, the retrieving operation may be performed under such condition that the application program used for retrieving the stored data has been stored in this CD-ROM 5.

Although the data was the telephone number in the above-described preferred embodiments, alternatively other character data or combinations among character data, sound (acoustic) data, and image data may be employed as the input data. In case of a picture file system, data stored in CD-ROM may be constructed of image data indicative of pictures, and character data representative of titles and authors for the pictures. Furthermore, sound data used for explaining the pictures may be additionally employed. In such a case, the above-described retrieving operation is carried out based on the character data. In such a file system, the picture is displayed on the display apparatus 3 in response to the retrieved image data in FIG. 1. It is of course that the data is expanded, while displaying the picture, thereby to reproduce the original image data. Also, for instance, the sound data is compressed by way of the ADPCN (adaptive type DPCM) modulation, and the sound data read out from CD-ROM 5 is demodulated in the ADPCM demodulating circuit 17 and then supplied via the amplifier 14 to the speaker 15.

As previously stated, an application program has been stored in CD-ROM 5 so that various types of data retrieving operations may be performed and the general-purpose type retrieving system may be achieved.

It should be noted that when the system is exclusively used for retrieving a specific sort of data, a program used for processing this data retrieval is merely stored in ROM 7 as a system program.

Furthermore, as another modified embodiment of the present invention, translations from one sort of languages into the other sort of languages such as a English-Japanese dictionary, a Japanese-English dictionary and a dictionary giving the meaning of combinations of Chinese characters as they are used in Japan, are arranged in CD-ROM in a form of hierarchical structure such as alphabetic syllabary and a Japanese syllabary. The retrieved results may be displayed on the display apparatus in such a manner that an English word is translated into a Japanese word, or vice versa. It should be understood that these retrieved results may be outputted as sounds. Moreover, although the keyboard was employed as the input means of the information in the above-described preferred embodiments, alternatively other information input means such as acoustic input means and image input means and image input mean such as OCR input means may be employed.

Also, although CD-ROM was employed as the recording medium in the above-described preferred embodiments, it is obvious that other disk shaped recording medium, such as a magnetic disk, may be employed.

Furthermore, the above-explained data arrangement rule was set as the order of the Japanese syllabary. However, the present invention is not limited to this arrangement rule, but may employ other arrangement rules such as an alphabetic syllabary.

In accordance with the above-described preferred embodiments, since the information is inputted and the seeking operation to the data recording position corresponding to this input information is performed, when this formation input operation is completed, the reproducing position of the head is located at the recording position of this data, so that even when the data recorded on any positions are retrieved, the retrieving time can be extremely shortened and also be made constant irrelevant to the recording positions, and the high-speed retrieving operation may be realized.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An information retrieving system wherein information arranged by a series of characters is inputted and data corresponding to said inputted information is read out from a disk-shaped recording medium, comprising:
   a disk-shaped recording medium, and
   a head which searches for a direction of a recording position of said data on said disk-shaped recording medium, corresponding to said inputted information, every time a character of the series of characters of said inputted information is successively inputted,
   said head stopping at said recording position of said data upon completion of an entry operation of said inputted information.

2. An information retrieving system as in claim 1, wherein each position sought by said head corresponds to a recording position for that data recorded at a head position taking into consideration the data already inputted corresponding to said information arranged by said character series.

3. An information retrieving system as in claim 1, wherein said disk-shaped recording medium corresponds to a CD-ROM. (compact disk-read-only memory).

4. An information retrieving system as in claim 1, wherein said inputted information is entered by a keyboard.

5. An information retrieving system as in claim 1, further comprising:
   a display apparatus for displaying both said inputted information and output data.

6. An information retrieving system as in claim 1, wherein data corresponding to said inputted information is a telephone number.

7. An information retrieving system as in claim 5, wherein said display apparatus is a display screen, and non-outputted retrieved item numbers are displayed on said screen in such event that plural retrieved output data exists.

8. An information retrieving system as in claim 6, further comprising telephone connecting means for converting telephone number data obtained based on the retrieval result into a dial signal, and connecting said information retrieving system to a telephone set of a corresponding telephone number.

9. An information retrieving system comprising:
   a disk-shaped recording medium, for storing retrievable information data recorded under a predetermined rule, and
   a retrieving apparatus, including:
      input means for inputting information via retrieving keys;
         data reading means for reading out said retrievable information data recorded at a position of said disk-shaped recording medium by moving in a radial direction of said disk-shaped recording medium in accordance with instruction from a control means;

memory means for storing a retrievable table comprising index information comprised of index data structured by a tree-structure relation based on said recorded predetermined rule of said retrievable data of said disk-shaped recording medium, placing a first character of said index data at a summit of said tree-structure relation and address information composed of addresses on said disk-shaped recording medium in connection with said retrievable data corresponding to said index information; and, control means for retrieving said retrievable table at each of said retrieving keys, every time each character of inputted information is entered from said input means, and to move said data reading means to said address obtained.

10. An information retrieving system according to claim 9, wherein said retrievable table is stored in said disk-shaped recording medium and said retrievable table is loaded to said memory means at such time of retrieving information.

11. An information retrieving method for a retrieving apparatus comprising a disk-shaped recording medium storing retrievable data, and a retrievable table comprising index information comprised of index data structured by a tree-structure relation based on a recorded predetermined rule of the retrievable data of the disk-shaped recording medium, providing a plurality of key inputs for retrieving data on said disk-shaped recording medium, retrieving said retrievable table at each of said retrieving key inputs by one character to obtain an address on said disk-shaped recording medium, and moving a data reading means of said retrieving apparatus at each retrieving key input sequentially to said address to read retrievable data existing in the address on said disk-shaped recording medium.

12. An information retrieving system as in claim 9, wherein said disk-shaped recording medium corresponds to a CD-ROM (compact disk-read-only memory).

13. An information retrieving system as in claim 9, wherein said input means for inputting information comprises a keyboard.

14. An information retrieving system as in claim 9, further including a display apparatus for displaying both said inputted information and output data.

15. An information retrieving system as in claim 9, wherein data corresponding to said inputted information is a telephone number.

16. An information retrieving system as in claim 14, wherein said display apparatus is a display screen and non-outputted retrieved item numbers are displayed on said screen, in such event that plural retrieved output data exists.

17. An information retrieving system as in claim 9, further including telephone connecting means for converting telephone number data obtained based on the retrieval result into a dial signal, and connecting said information retrieving system to a telephone set of a corresponding telephone number.

18. An information retrieving system wherein information arranged by a series of characters in inputted and data corresponding to said inputted information is read out from a disk-shaped recording medium, comprising:

a disk-shaped recording medium, and a head which searches for a direction of a recording position of said data on said disk-shaped recording medium, corresponding to said inputted information, every time a character of said series of characters of said inputted information is successively inputted, said head stopping at said recording position of said data upon completion of an entry operation of said inputted information wherein each position sought by said head corresponds to a recording position for that data recorded at a head position taking into consideration that data already inputted corresponding to said information arranged by said character series.

* * * * *